(12) United States Patent
Busch

(10) Patent No.: US 9,199,296 B2
(45) Date of Patent: Dec. 1, 2015

(54) SHEET METAL PROCESSING SYSTEMS AND RELATED DEVICES AND METHODS

(75) Inventor: Marcus Busch, Dresden (DE)

(73) Assignee: TRUMPF Sachsen GmbH, Neukirch (DE)

( * ) Notice: Subject to any disclaimer, the term of this patent is extended or adjusted under 35 U.S.C. 154(b) by 981 days.

(21) Appl. No.: 13/275,489

(22) Filed: Oct. 18, 2011

(65) Prior Publication Data

US 2012/0100974 A1 Apr. 26, 2012

(30) Foreign Application Priority Data

Oct. 20, 2010 (EP) .................................... 10188135

(51) Int. Cl.
| | | |
|---|---|---|
| *B23Q 3/155* | (2006.01) | |
| *B21D 37/04* | (2006.01) | |
| *B21D 43/00* | (2006.01) | |
| *B21D 37/14* | (2006.01) | |
| *B23Q 15/24* | (2006.01) | |

(52) U.S. Cl.
CPC .............. *B21D 37/14* (2013.01); *B21D 43/003* (2013.01); *B23Q 15/24* (2013.01); *Y10T 483/10* (2015.01); *Y10T 483/13* (2015.01); *Y10T 483/16* (2015.01); *Y10T 483/1729* (2015.01); *Y10T 483/1731* (2015.01)

(58) Field of Classification Search
CPC ............ Y10T 483/13; Y10T 483/1729; Y10T 483/1731; Y10T 483/16
USPC .............................................. 483/7, 28–29, 14
See application file for complete search history.

(56) References Cited

U.S. PATENT DOCUMENTS

| | | | | |
|---|---|---|---|---|
| 4,819,320 | A * | 4/1989 | Cairns et al. ....................... | 483/7 |
| 5,097,587 | A * | 3/1992 | Yasuda ........................... | 483/10 |
| 5,224,915 | A | 7/1993 | Kilian | |
| 5,669,866 | A | 9/1997 | Julian et al. | |
| 7,632,224 | B2 * | 12/2009 | Rouweler et al. ................ | 483/28 |
| 2002/0151420 | A1 * | 10/2002 | Scott et al. ...................... | 483/29 |
| 2011/0308362 | A1 * | 12/2011 | Buettner et al. .................. | 83/13 |

FOREIGN PATENT DOCUMENTS

| | | |
|---|---|---|
| EP | 2198991 A1 | 1/2000 |
| JP | 11333534 | 12/1999 |
| JP | 2005028432 A | 2/2005 |
| WO | WO2010072411 A1 | 7/2010 |

* cited by examiner

*Primary Examiner* — Erica E Cadugan
(74) *Attorney, Agent, or Firm* — Fish & Richardson P.C.

(57) ABSTRACT

In some aspects, a sheet metal processing system includes a machine tool with a processing station at which metal sheets can be processed by a processing tool, a tool carrier for receiving a processing tool, a transfer device by which the processing tool can be moved to or from the tool carrier, and a tool change apparatus which, due to a controlled positioning movement, can be arranged in a tool change position. The processing tool is exchangeable between the tool carrier and the transfer device by the tool change apparatus. The positioning movement is controllable on the basis of a position of the transfer device and/or a position of the tool carrier.

8 Claims, 14 Drawing Sheets

SHEET METAL PROCESSING SYSTEMS AND RELATED DEVICES AND METHODS

CROSS REFERENCE TO RELATED APPLICATION

This application claims priority under 35 U.S.C. §119 to European Application No. 10 188 135.7, filed on Oct. 20, 2010. The contents of this priority application are hereby incorporated by reference in their entirety.

TECHNICAL FIELD

The invention relates to sheet metal processing systems and related devices and methods.

BACKGROUND

Certain conventional loading and unloading units of sheet metal processing systems are capable of performing multiple functions. In some cases, a loading and unloading unit is used to provide a sheet-metal processing machine with workpieces (e.g., sheets) to be processed. The loading and unloading unit can also be used to transfer processing tools between a linear magazine of the processing machine and a tool store provided on a frame of the loading and unloading unit. In order to change a tool, the loading and unloading unit includes a tool change apparatus in the form of a pincer-like gripper. With suitable travel, the loading and unloading unit moves the gripper relative to a tool carrier of the machine-side linear magazine or relative to a tool carrier in the store into a tool change position in which a processing tool can be delivered by the gripper to the relevant tool carrier or can be removed by the gripper from the relevant tool carrier. A functionally reliable tool change can benefit from accurate mutual positioning of the gripper and of the relevant tool carrier. The tool change position of the gripper is typically stored in the numerical control of the sheet metal processing system. Using the stored position, the gripper is transferred into the tool change position by the loading and unloading unit with a controlled positioning movement. In defining the tool change position, both the gripper and the tool carrier to be served are assumed to have a nominal position.

SUMMARY

In some aspects of the invention, a sheet metal processing system includes a sheet metal processing station having a processing tool, a tool carrier for receiving the processing tool, a transfer device for moving the processing tool toward or away from the tool carrier, and a tool change apparatus that can be arranged in a tool change position to move the processing tool between the tool carrier and the transfer device, where a detection device detects the position of the transfer device and/or the position of the tool carrier before a tool change. The actual position of the transfer device and/or the actual position of the tool carrier to be served are determined. A positioning movement used to transfer the tool change apparatus into the tool change position is controlled based on the actual position determined. The conditions existing at the sheet metal processing system at the time of the tool change are therefore taken into account when positioning the tool change apparatus relative to the transfer device and/or relative to the tool carrier. Thus, a tool change can be carried out in a functionally reliable manner, even when the actual position of the transfer device and/or of the tool carrier is subject to change. Such changes in position may occur due to deformation at the transfer device and/or due to deformation of the support structure provided with the tool carrier. Position detection can be important in cases in which the tool change apparatus and the tool carrier to be served are fitted on different support structures that are mechanically separate from each other. Due to the mechanical separation, an unforeseen change of position occurring at one of the support structures and not taken into account in the machine control does not necessarily involve a corresponding change of position at the other support structure. In practice, such unilateral changes in position may occur on machine tools that are mounted in a pneumatically-cushioned manner and the position or orientation of which changes appreciably as a result of the pneumatic cushioning when the load conditions vary. Tool carriers to be used can be store-side and magazine-side tool carriers. Tool carriers directly on the processing station of the machine tool can also be used.

In some embodiments, a tool carrier on the machine tool side is provided as the tool carrier to be used by the tool change apparatus. The tool carrier on the machine tool side can be part of a linear tool magazine of the machine tool. Such linear magazines include several tool carriers that are arranged along a support rail. The support rail is guided on a transverse guide of a conventional coordinate guide. So that the tool carriers provided on the support rail can be positioned relative to the transfer device for the tool change, the support rail is longitudinally movable relative to the transverse guise. The support rail projects from the transverse guide a greater or lesser distance depending on the position in its direction of movement. Depending on the projecting length, the support rail can bend under the effect of gravity, or due to the machine tool provided with the support rail being inclined, to a varying extent. Consequently, the position of the tool carriers arranged on the support rail varies in the coordinate system of the control of the sheet metal processing system. The changes in position that occur can be detected and, when the tool change apparatus is transferred into the tool change position, they can be compensated for by appropriate control of the positioning movement performed by the tool change apparatus.

In some embodiments, the sheet metal processing system includes a store for processing tools. In such embodiments, it is possible for the transfer device of the arrangement to transfer processing tools between the store and a tool carrier on the machine tool. The tool change apparatus is transferred into the tool change position in the manner described above.

Additionally or alternatively, a tool carrier of the store for processing tools can be provided as the tool carrier served by the tool change apparatus.

In some cases, the tool change apparatus is kinematically connected to the transfer device or to the tool carrier in order to perform the controlled positioning movement. Due to this feature, the drive of the transfer device or the drive of the tool carrier can be used for the positioning movement of the tool change apparatus. A separate positioning drive for transferring the tool change apparatus into the tool change position is typically unnecessary in this case.

In some embodiments, the kinematic connection of the tool change apparatus and the transfer device or the kinematic connection of the tool change apparatus and the tool carrier is releasable when the tool change apparatus reaches the tool change position. Such a configuration takes into account that the tool change position of the tool change apparatus may vary (e.g., due to external influences). If the tool change apparatus is provided with the transfer device and is thus kinematically connected thereto, the transfer device can, when transferring processing tools, be moved into the same position at the machine tool irrespective of unforeseen changes in position. In some cases, it is advantageous that the tool change apparatus arrives in the tool change position before the transfer device reaches its fixed end position. On the way to its end position, the transfer device deposits the tool change apparatus practically in the tool change position, releasing the kinematic connection existing between the two devices.

There are various possibilities for the form of the detection device for performing the operation of detecting the position of the transfer device and/or the tool carrier. In some embodiments, a stop that cooperates with an associated counter-stop is used for position detection and therefore for positioning the tool change apparatus in the tool change position. This position detection technique has improved sturdiness and functional reliability even under harsh ambient conditions. In contrast, in some embodiments, switching arrangements include detection elements with a suitable configuration that permit contactless position detection.

An especially high degree of functional reliability can be achieved by using multi-axial position detection (e.g., three axis position detection) and including multi-axial control of the positioning movement of the tool change apparatus.

In some embodiments, position detection is carried out before each individual tool change.

The details of one or more embodiments of the invention are set forth in the accompanying drawings and the description below. Other aspects, features, and advantages of the invention will be apparent from the description and drawings, and from the claims.

DETAILED DESCRIPTION

Figure 1:
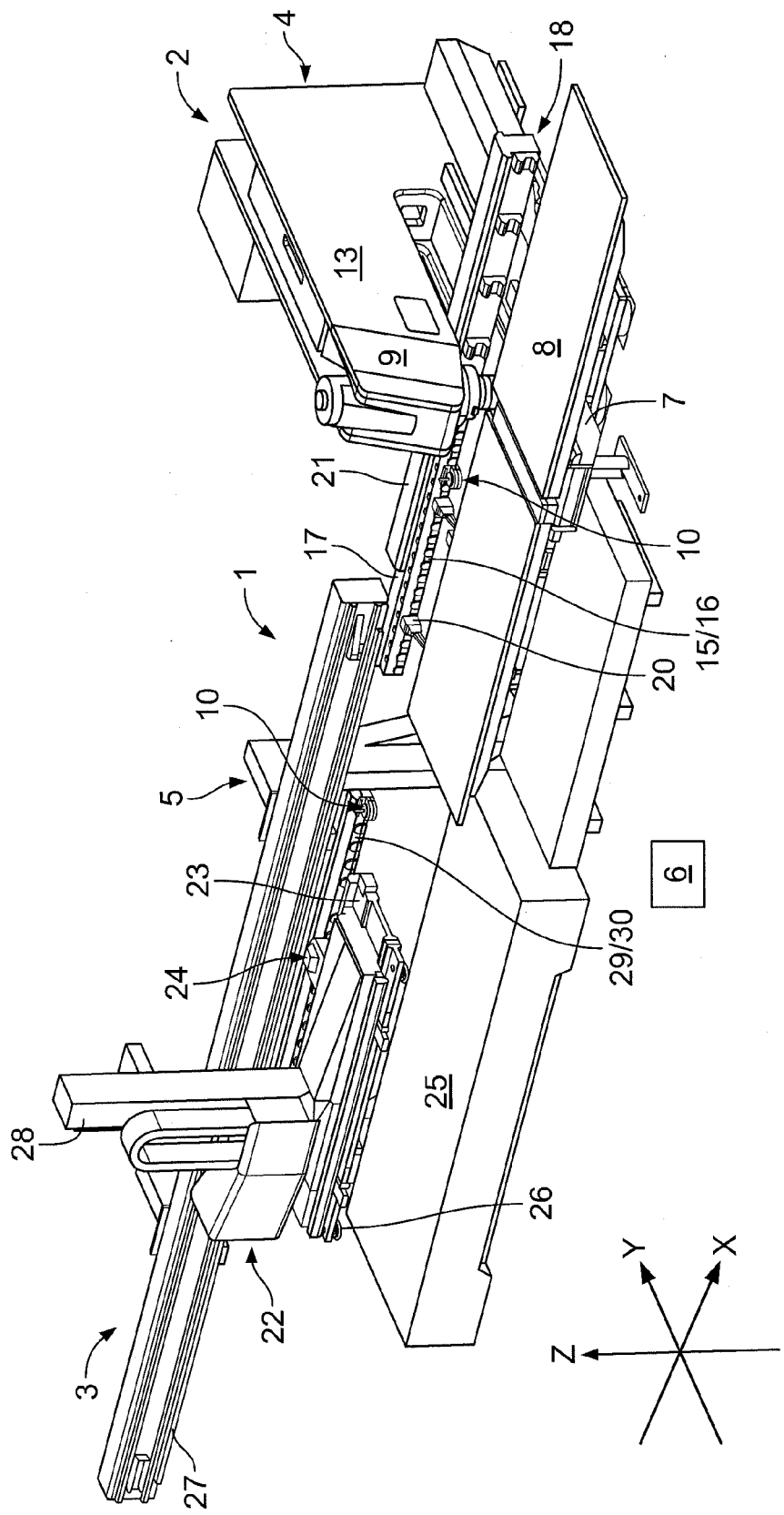
FIG. 1 shows a sheet-metal processing system having a machine tool and an automating device.

According to FIG. 1, a sheet metal processing system 1 includes a machine tool in the form of a punch machine 2 and an automating device 3 provided therefor. The punch machine 2 and the automating device 3 are positioned next to each other but are mechanically separate from each other. Accordingly, there is no mechanical connection between a C-shaped machine frame 4 of the punch machine 2 and a support structure 5 of the automating device 3. Common to the punch machine 2 and the automating device 3 is a numerical machine control 6 that controls many important functions of the punch machine 2 and the automating device 3.

Figure 2:
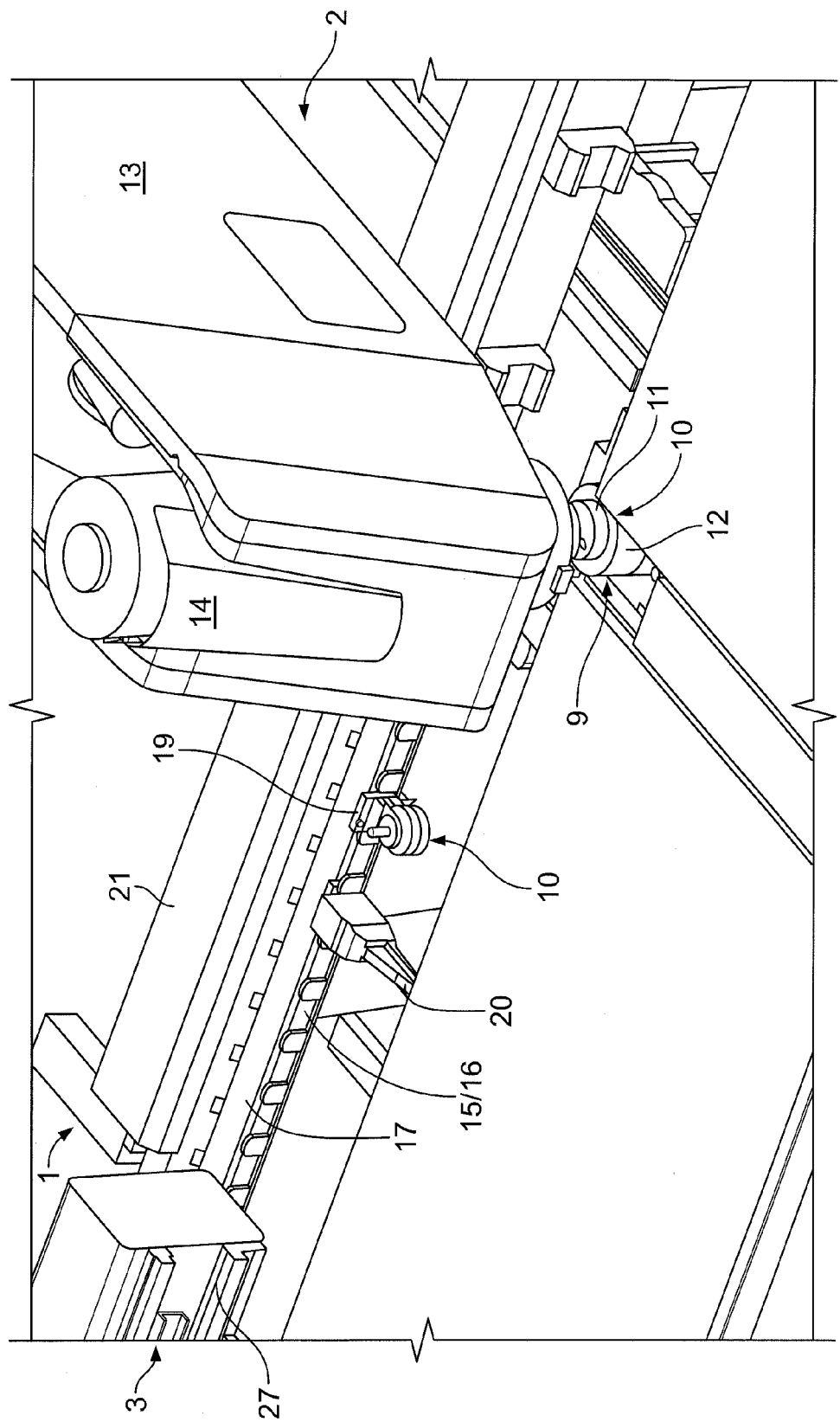
FIG. 2 shows an enlarged cut-out from FIG. 1.

A workpiece rest 8 is supported on a lower frame leg 7 of the machine frame 4 of the punch machine 2. Metal sheets are processed at a processing station, which is in the form of a punching station 9, of the punch machine 2. As shown in FIG. 2, a punching tool 10 is, for this purpose, mounted as the processing tool on the tool carrier of the punching station 9. The punching tool 10 is of conventional structure and includes a punch 11 at the free end of an upper frame leg 13 of the punch machine 2 and a die 12 on the lower frame leg 7 of the punch machine 2. A numerically controlled punch drive 14 moves the punch 11 in the usual manner relative to the die 12.

Different punching tools 10 are mounted to the punching station 9 of the punch machine 2, depending on the processing task. A plurality of punching tools 10 are held in machine-side tool carriers 15 as replacements for the punching tool 10 in use at the punching station 9. For clarity, only a single replacement tool is shown in FIGS. 1 and 2. However, multiple different replacement tools would typically be held by the machine side tool carriers 15.

The machine-side tool carriers 15 form a linear magazine 16 for punching tools 10. They are secured to a transverse rail 17 of a conventional coordinate guide 18 accommodated in the cavity of the machine frame 4. The punching tools 10 are inserted into the machine-side tool carriers 15 in the usual manner via tool holders 19, which are referred to as tool cartridges. Near the machine-side tool carriers 15, the transverse rail 17 carries clamping claws 20 for metal sheets to be processed.

The transverse rail 17 is moved in a horizontal plane for changing tools at the punching station 9 and also for moving metal sheets to be processed relative to the punching station 9. This horizontal plane is defined by an X axis and a Y axis. During movement in the direction of the X axis, the transverse rail 17 is guided on a transverse guide 21 of the coordinate guide 18. The transverse guide 21 is movable together with the transverse rail 17 in the direction of the Y axis.

The mobility of the transverse rail 17 is also used on the sheet metal processing system 1 to equip the linear magazine 16 with the punching tools 10 required at the punching station 9. If the transverse rail 17 is moved relative to the transverse guide 21 in the direction of the X axis into the position according to FIGS. 1 and 2, then, on the side of the machine frame 4 of the punching machine 2 that faces the automating device 3, punching tools 10 can be delivered to the machine-side tool carriers 15 of the transverse rail 17 or taken over from the machine-side tool carriers 15.

The tool change at the machine-side tool carriers 15 of the transverse rail 17 is carried out in an automated manner by the automating device 3, typically by an operating unit 22 of the automating device 3.

The operating unit 22 of the automating device 3 includes a suction frame 23 as the transfer device and a tool change unit 24 coupled to the suction frame 23.

Metal sheets to be processed are transported by the suction frame 23 from a storage area 25 to the punch machine 2. The underside of the suction frame 23 includes vacuum suction devices 26 for securing the metal sheets to be transported.

The operating unit 22 with the suction frame 23 and the tool change unit 24 coupled thereto is movable in a motor-driven and numerically controlled manner in the direction of the X axis and in the direction of a Z axis. The movements of the operating unit 22 are guided by a horizontal guide rail 27 and an upright guide rail 28. Beneath the horizontal guide rail 27, a store 29 for punching tools 10 is provided on the support structure 5 of the automating device 3. The store 29 has store-side tool carriers 30 arranged adjacent to each other in the horizontal direction. The relevant punching tools 10 are also fitted to the store-side tool carriers 30 by tool holders 19.

Figure 5:
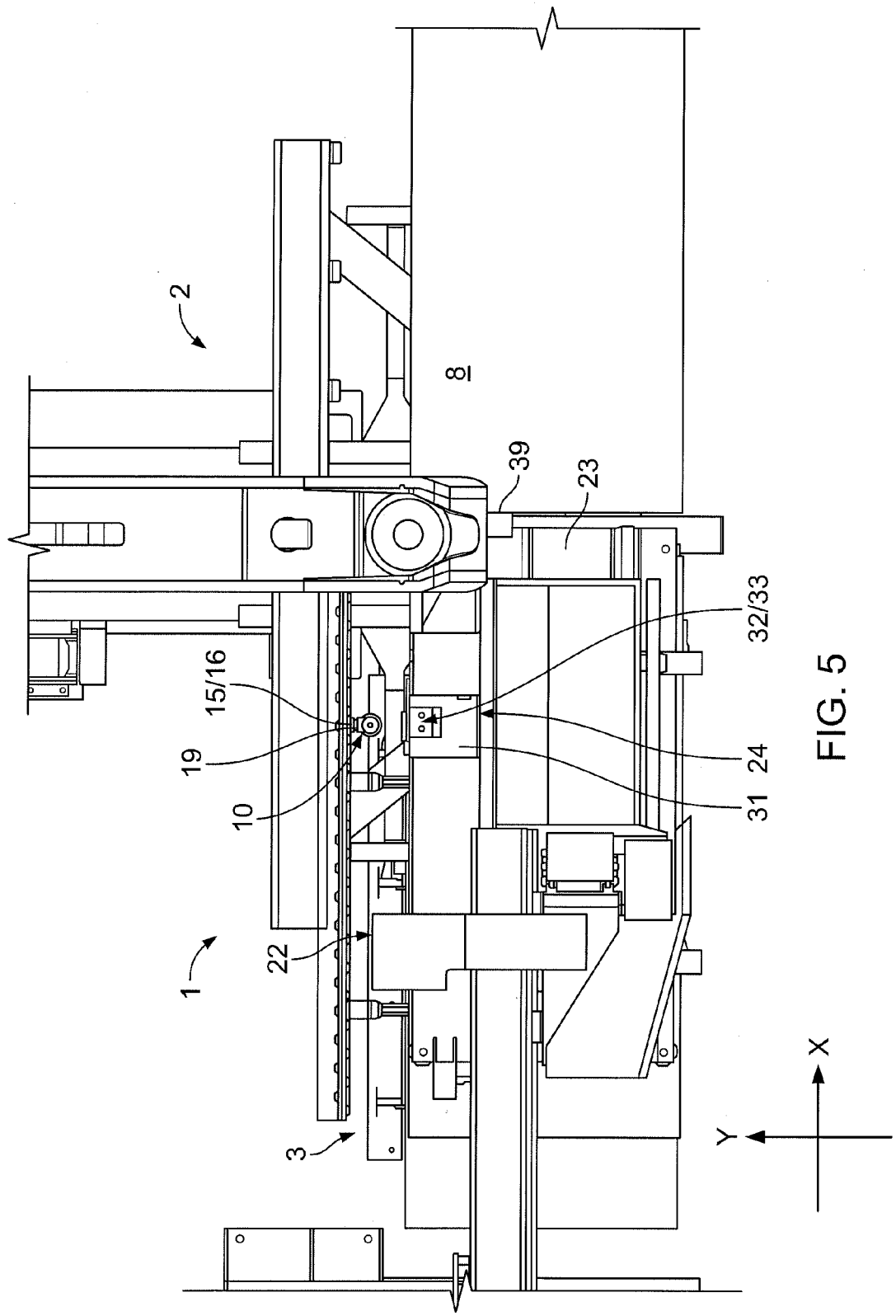

The tool change unit 24 includes a housing 31 and a gripper 32 (shown in FIG. 5). A tool change apparatus is included in the form of a clamp 33 of the gripper 32 (shown in FIG. 7).

If, starting from the conditions shown in FIGS. 1 and 2, the punching tool 10 held on the transverse rail 17 of the punch machine 2 is to be exchanged, the clamp 33 of the tool change unit 24 is transferred with a numerically controlled positioning movement into a tool change position. A positioning movement of the clamp 33 is performed in all three axial directions.

Figure 3:
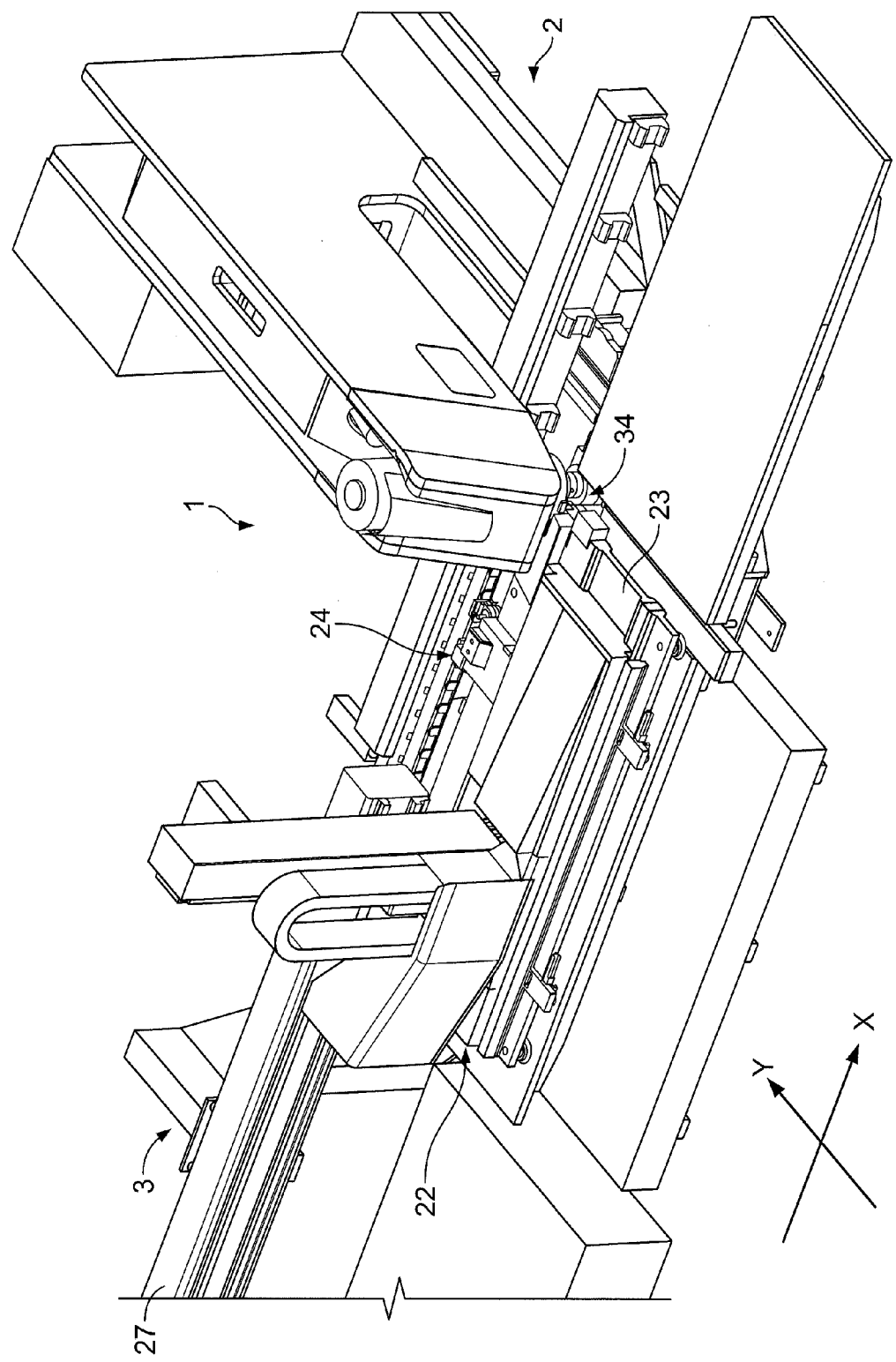
FIGS. 3 to 11 sequentially show a removal of a tool from the machine tool shown in FIG. 1.
Figure 4:
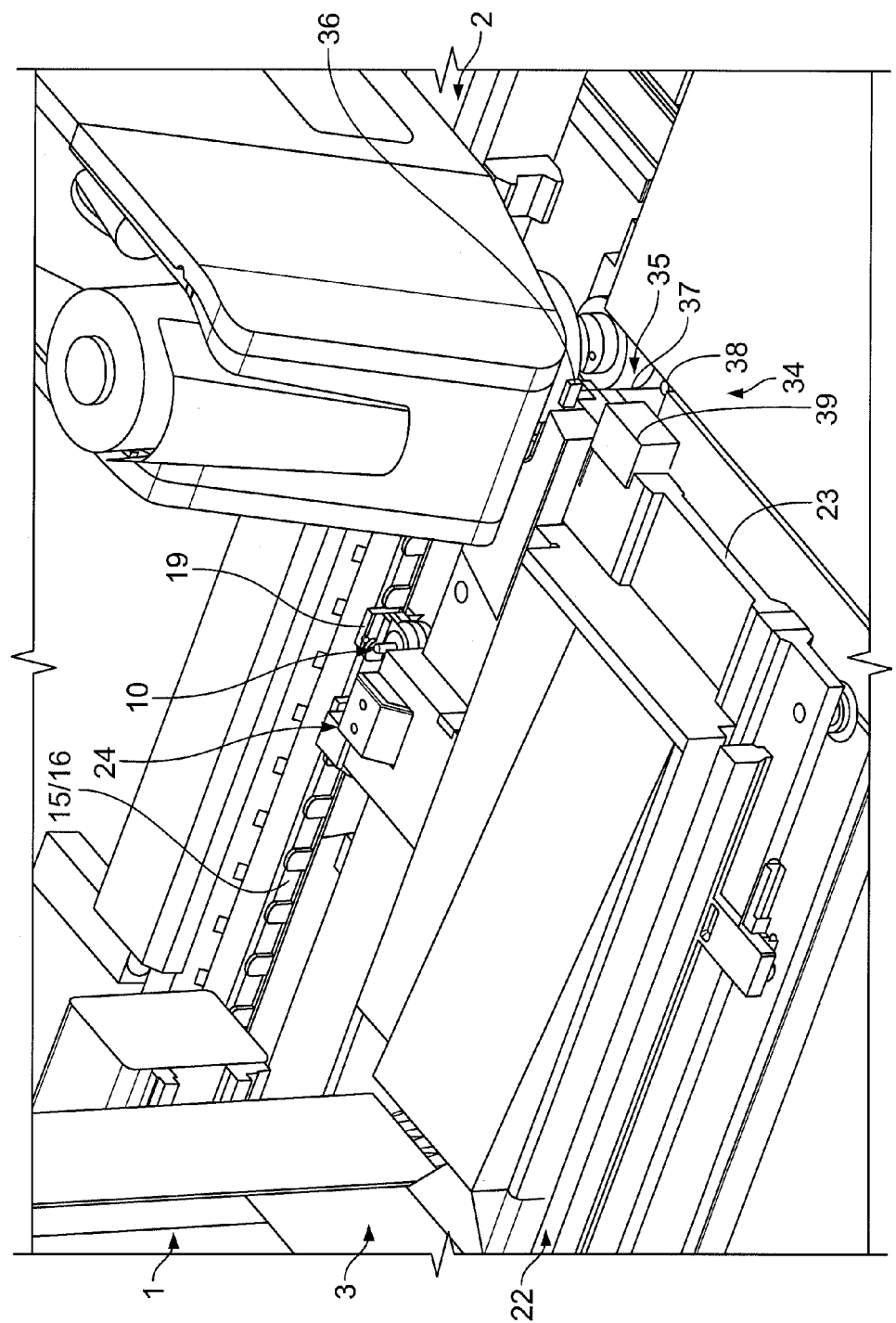

In the direction of the X axis, the operating unit 22 travels with the tool change unit 24 and the clamp 33 along the horizontal guide rail 27 of the automating device 3 out of the position shown FIGS. 1 and 2 and into the position shown in FIGS. 3 and 4. The end position of the operating unit 22 in the direction of the X axis and thus also the position reached in that axial direction by the clamp 33 arranged in the tool change position are defined by a first detection device 34 which is shown in FIG. 4.

The first detection device 34 is in the form of a switching arrangement and includes as the first switching element a laser light barrier 35 having a laser light source 36, a laser light beam 37 emanating therefrom, and a laser light receiver 38. The laser light barrier 35, like the transverse rail 17 of the linear magazine 16 and the machine-side tool carriers 15 fitted thereto, is connected to the machine frame 4 of the punch machine 2. In the event of a displacement of the machine frame 4 and an associated displacement of the machine-side tool carriers 15 in the X direction, the laser light barrier 35 also undergoes that displacement. Consequently, the position of the laser light barrier 35, and especially the position of the laser light beam 37, represents the position of the machine frame 4 and the machine-side tool carriers 15 supported thereon, in the direction of the X axis.

To act as the second switching element of the first detection device 34, an edge 39 of the suction frame 23, which is the leading edge when the operating unit 22, moves towards the punch machine 2 in the direction of the X axis and interacts with the laser light barrier 35. The leading edge 39 of the suction frame 23 is arranged in a defined manner relative to the tool change apparatus placed on the suction frame 23, that is to say, relative to the clamp 33. Consequently, the instantaneous position of the leading edge 39 of the suction frame 23 also indirectly represents the instantaneous position of the clamp 33 in the direction of the X axis.

Once the leading edge 39 of the suction frame 23 reaches the laser light barrier 35 at the punch machine in the course of the movement performed by the operating unit 22 in the direction of the X axis, and interrupts the laser light beam 37, the first detection device 34 generates a switching signal for the numerical machine control 6. On the basis of that switching signal, the numerical machine control 6 stops the positioning drive by which the operating unit 22 is moved in the direction of the X axis.

FIG. 5 shows the conditions of the punch machine 2 at the point along the X axis when the positioning drive of the operating unit 22 and thus also of the tool change apparatus, or of the clamp 33, has stopped and is consequently at the point when the clamp 33 assumes its position associated with the tool change position in the direction of the X axis.

The clamp 33 lies opposite the machine-side tool carrier 15, with the punching tool 10 to be removed therefrom, and at a distance in the direction of the Y axis. The gripper 32 with the clamp 33 has been withdrawn into the housing 31 of the tool change unit 24. The clamp 33 of the tool change unit 24 lies, in the direction of the Z axis, above the punching tool 10 and also above the tool holder 19 which is supported on the relevant machine-side tool carrier 15 and which accommodates the punching tool 10.

Figure 6:
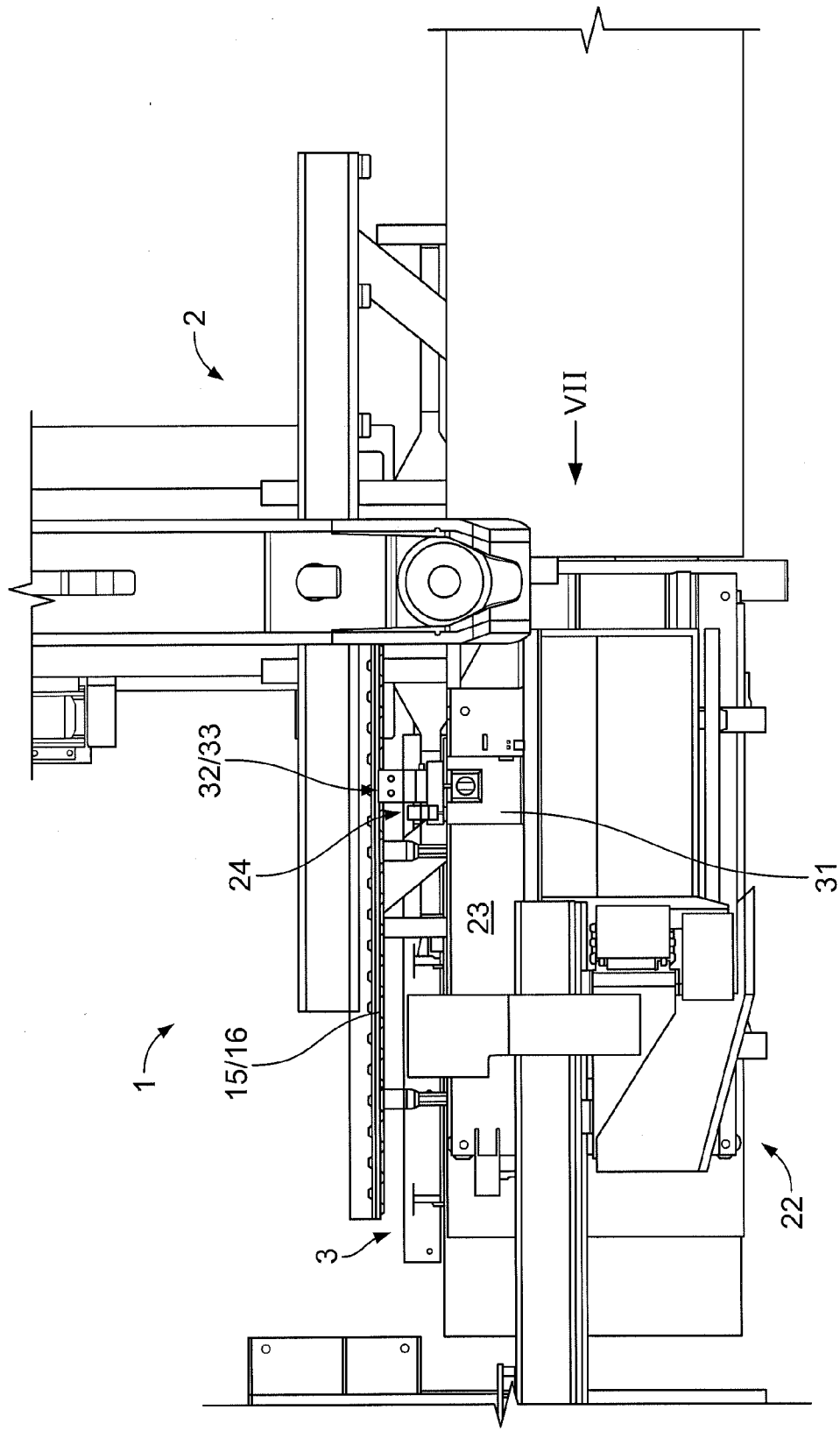

Starting from the operating state of the tool change unit 24 illustrated in FIG. 5, the gripper 32 with the clamp 33 travels out of the housing 31 in the direction of the Y axis into the position shown in FIG. 6. The extent of the movement of the gripper 32 is stored as a fixed value in the machine control 6. Since, in the direction of the Y axis, the displacements of the suction frame 23 with the tool change unit 24 and the machine-side tool carriers 15 do not have to be calculated, in the case shown, position detection in the direction of the Y axis and variable control of the positioning movement of the clamp 33 in that direction can be omitted. The conditions resulting after the travelling movement of the clamp 33 in the direction of the Y axis are shown in FIG. 7 as viewed from the side in the direction of the arrow VII of FIG. 6.

Figure 7:
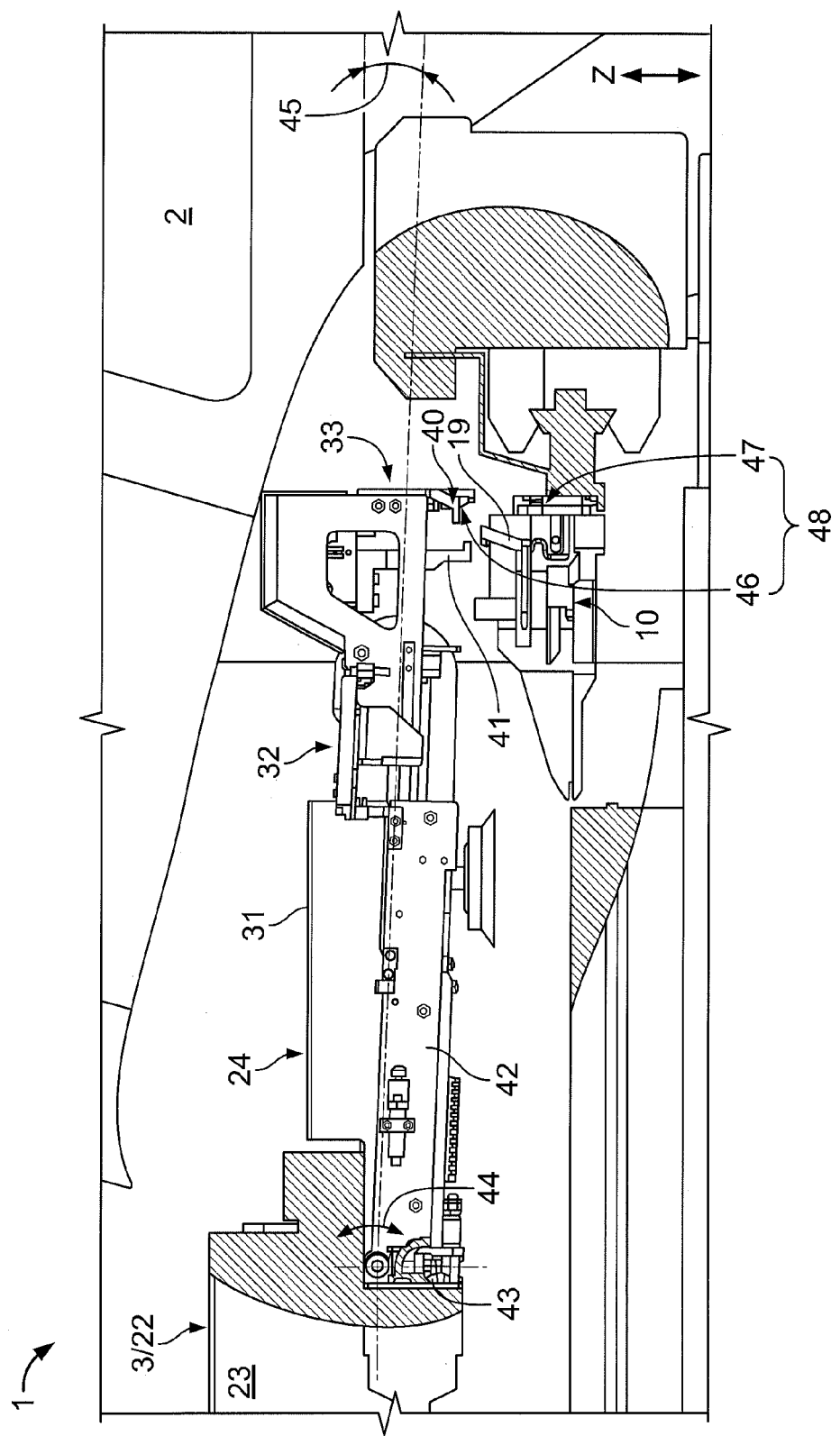

As shown in FIG. 7, the clamp 33 of the tool change unit 24 includes clamp legs 40, 41 lying opposite one another in the direction of the Y axis. The clamp legs 40, 41 are movable towards and away from each other in the direction of the Y axis in a manner that is mechanically driven (e.g., pneumatically driven) and numerically controlled. A clamp guide 42, which guides the clamp legs 40, 41 during their movement in the direction of the Y axis, is supported on the suction frame 23 to be pivotable to a limited extent in the direction of a double arrow 44 about a pivot axis 43 extending in the direction of the X axis. In FIG. 7, the clamp guide 42 together with the clamp 33 has moved downward about the pivot axis 43 by an excursion angle 45 relative to the horizontal axis. At a distance from the pivot axis 43, the clamp guide 42 is supported on the suction frame 23 in a downward direction under the action of a pretensioned spring.

The clamp leg 40 forms a stop 46 with its end face that points downward in the direction of the Z axis. On the machine, the stop 46 of the clamp leg 40 is assigned a counter-stop 47 that is provided on the tool holder 19 of the punching tool 10 to be changed.

The stop 46 on the clamp leg 40 and the counter-stop 47 on the tool holder 19 together form a second detection device 48. The stop 46 is arranged in a defined manner relative to the clamp 33 in the direction of the Z axis. Accordingly, the instantaneous position of the stop 46 in the direction of the Z axis represents the actual position of the clamp 33 in that direction. In a corresponding manner, the counter-stop 47 is associated with the machine-side tool carrier 15 of the punching tool 10 by way of the tool holder 19. The position of the counter-stop 47 in the direction of the Z axis consequently represents the position of the machine-side tool carrier 15 in that direction.

Figure 8:
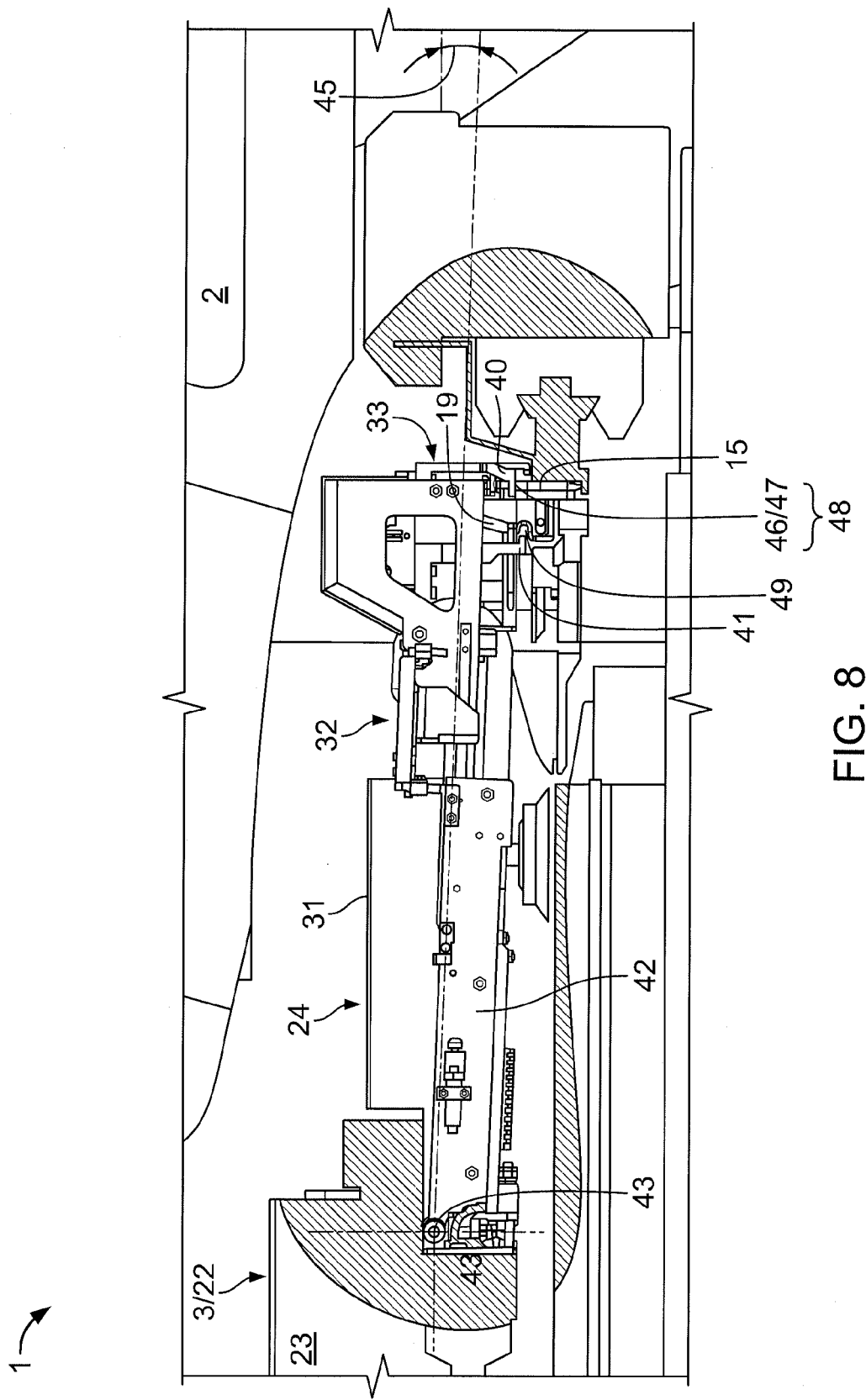

Starting from the operating state shown in FIG. 7, the operating unit 22 along with the gripper 32, the clamp 33, and the clamp guide 42 are lowered in the direction of the Z axis. The clamp 33 supported on the suction frame 23 descends with the suction frame 23 until the stop 46 on the clamp leg 40 comes into contact with the counter-stop 47 on the tool holder 19 (shown in FIG. 8).

Once the stop 46 of the clamp leg 40 has come to rest on the counter-stop 47 of the tool holder 19, the clamp 33 reaches the tool change position in the direction of the Z axis, that is to say, the position from which the clamp 33 can carry out a tool change.

Once the clamp 33 has reached the tool change position in the direction of the Z axis (i.e., once the clamp 33 is supported in the direction of the Z axis on the tool holder 19) and, by way of the tool holder 19, on the machine-side tool carrier 15, the clamp 33 remains at its position in the direction of the Z axis regardless of a continuing descending movement of the suction frame 23. Thus, a kinematic uncoupling of the suction frame 23 and the clamp 33 takes place. That kinematic uncoupling is rendered possible by the pivotable support of the clamp guide 42 and thus also of the clamp 33 on the suction frame 23.

Due to the pivotable support on the suction frame 23, during the descending movement in the direction of the Z axis, the clamp 33 automatically compensates for fluctuations in the level of the machine-side tool carrier 15 in the direction of the Z axis which occur, for example, as a result of displacements on the machine frame 4. The numerical machine control 6 can therefore bring about the descending movement of the suction frame 23 into a constant, unchanging end position in the direction of the Z axis. The end position of the suction frame 23 in the descending direction, which is stored in the numerical machine control 6, must merely be fixed in such a manner that the clamp 33 is placed reliably on the tool holder 19 before the suction frame 23 reaches its end position in the direction of the descending movement. Once the suction frame 23 is in its lower end position, then the clamp guide 42 extends horizontally (shown in FIG. 9).

Figure 9:
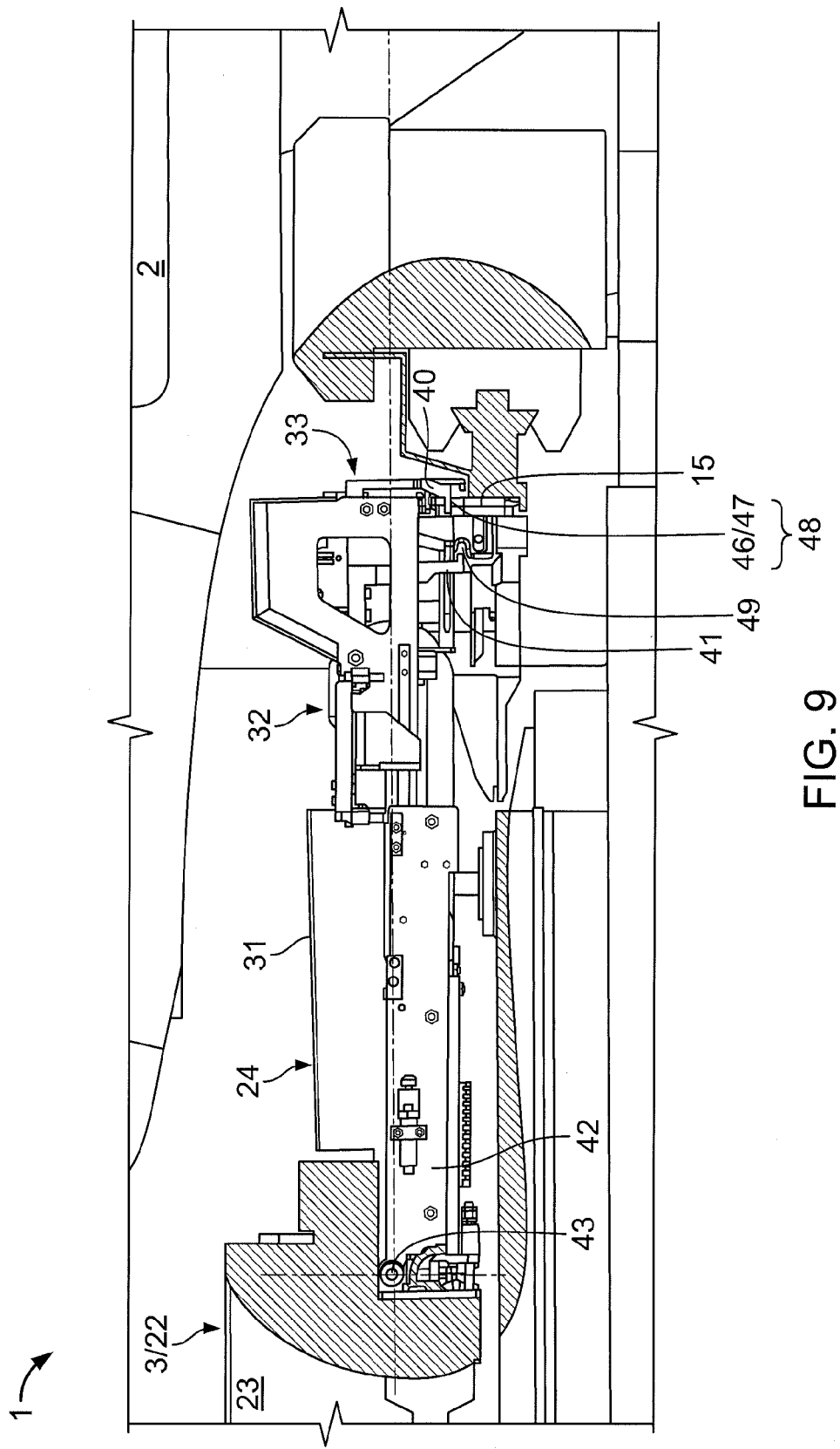

The clamp 33 transferred into the tool change position in the direction of the Z axis is shown in FIG. 9. In the direction of the X axis and also in the direction of the Y axis, the clamp 33 has already been moved beforehand into the tool change position in the manner described above.

After such movement, the clamp 33 now assumes the position in which the tool change can be carried out relative to the machine-side tool carrier 15 to be served, in the three axial directions.

Figure 10:
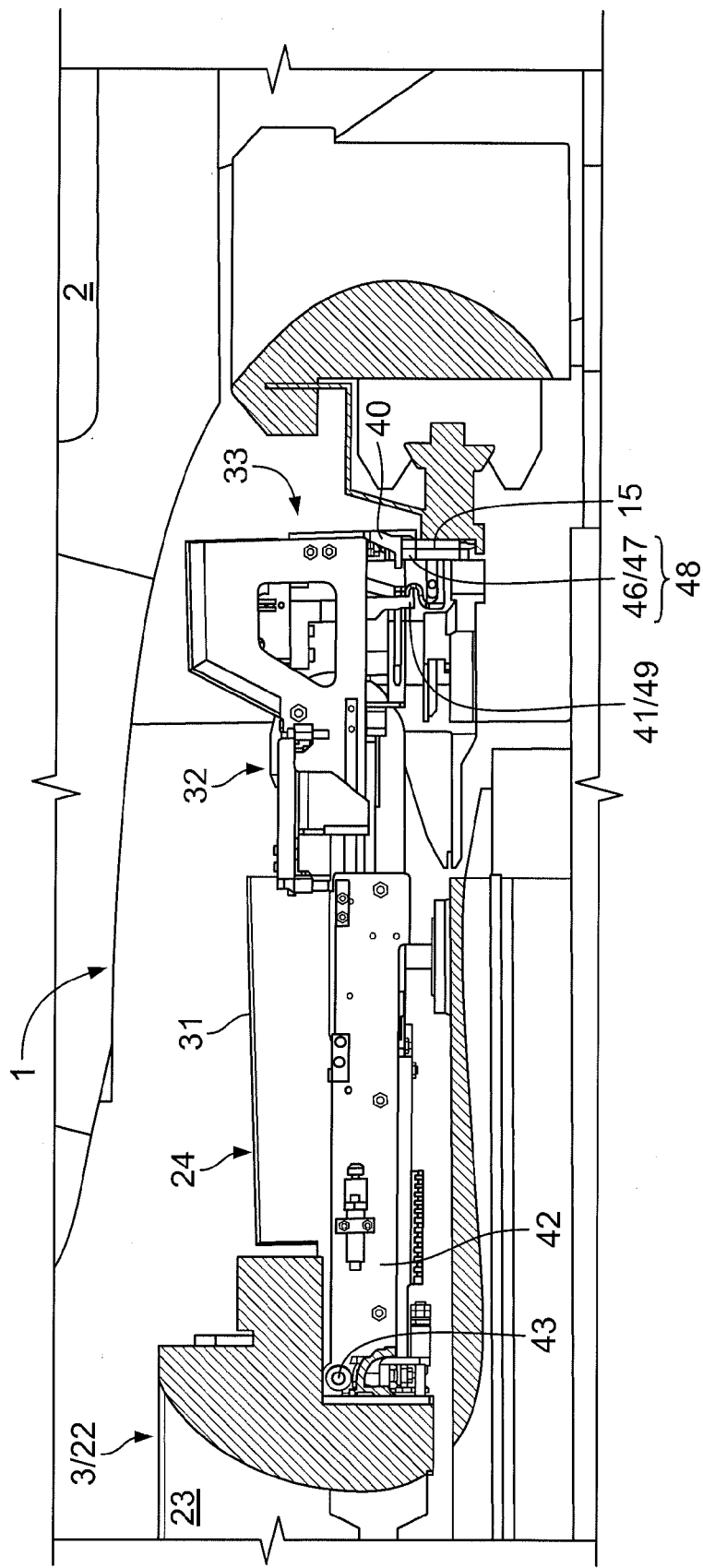

The clamp 33 is therefore closed by moving the clamp legs 40, 41 toward each other, in the direction of the Y axis. As that happens, the clamp leg 41 runs into an associated receiver 49 on the tool holder 19. The clamp leg 40 slides over the counter-stop 47 on the tool holder 19, but remains in contact with the counter-stop 47 as it does so (shown in FIG. 10).

Once a catch of the tool holder 19 on the machine-side tool carrier 15 is released, the punching tool 10 can be removed from the machine-side tool carrier 15 by an upward movement of the clamp 33 in the direction of the Z axis. For that purpose, the suction frame 23 is raised in the direction of the Z axis.

Figure 11:
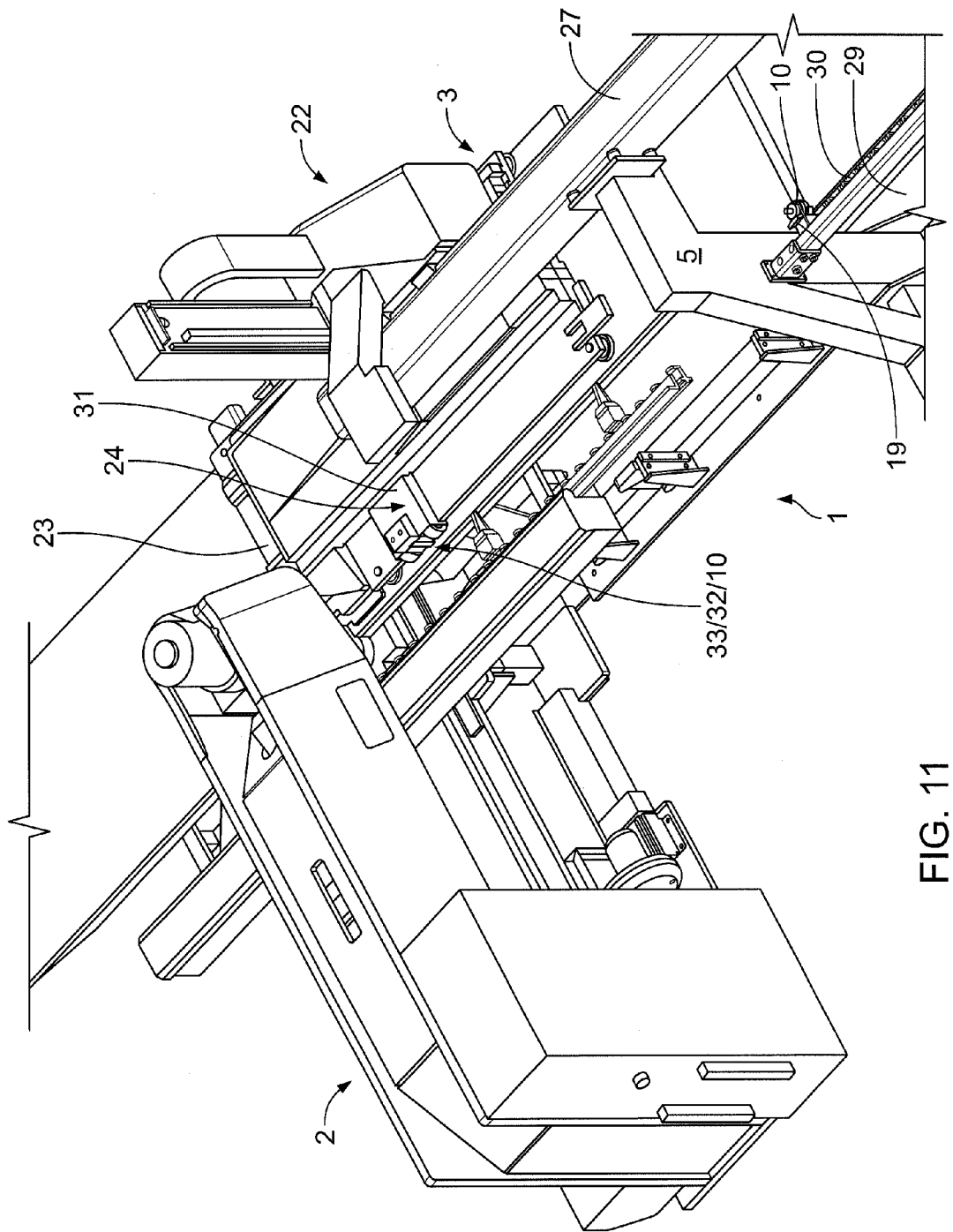

During its upward movement, the suction frame 23 begins kinematically uncoupled from the clamp 33. In this phase of movement, the upward motion of the suction frame 23 results in a pivoting movement, aided by the previously compressed spring, of the clamp 33 and the clamp guide 42 relative to the suction frame 23. During that pivoting movement, the clamp 33 retains its tool change position unaltered also in the direction of the Z axis. Once in the course of the ascending movement of the suction frame 23 the pivot angle limitation of the clamp guide 42 becomes effective, the clamp guide 42 again extends at the excursion angle 45 relative to the horizontal. As the ascending movement of the suction frame 23 continues, the suction frame 23 lifts the clamp 33 and the punching tool 10 held thereon in the direction of the Z axis. At the end of the ascending movement of the suction frame 23, the operating state shown in FIG. 6 has been restored. Starting from here, the clamp 33 with the punching tool 10 secured thereto is withdrawn into the housing 31 of the tool change unit 24 in the direction of the Y axis (shown in FIG. 11).

Figure 12:
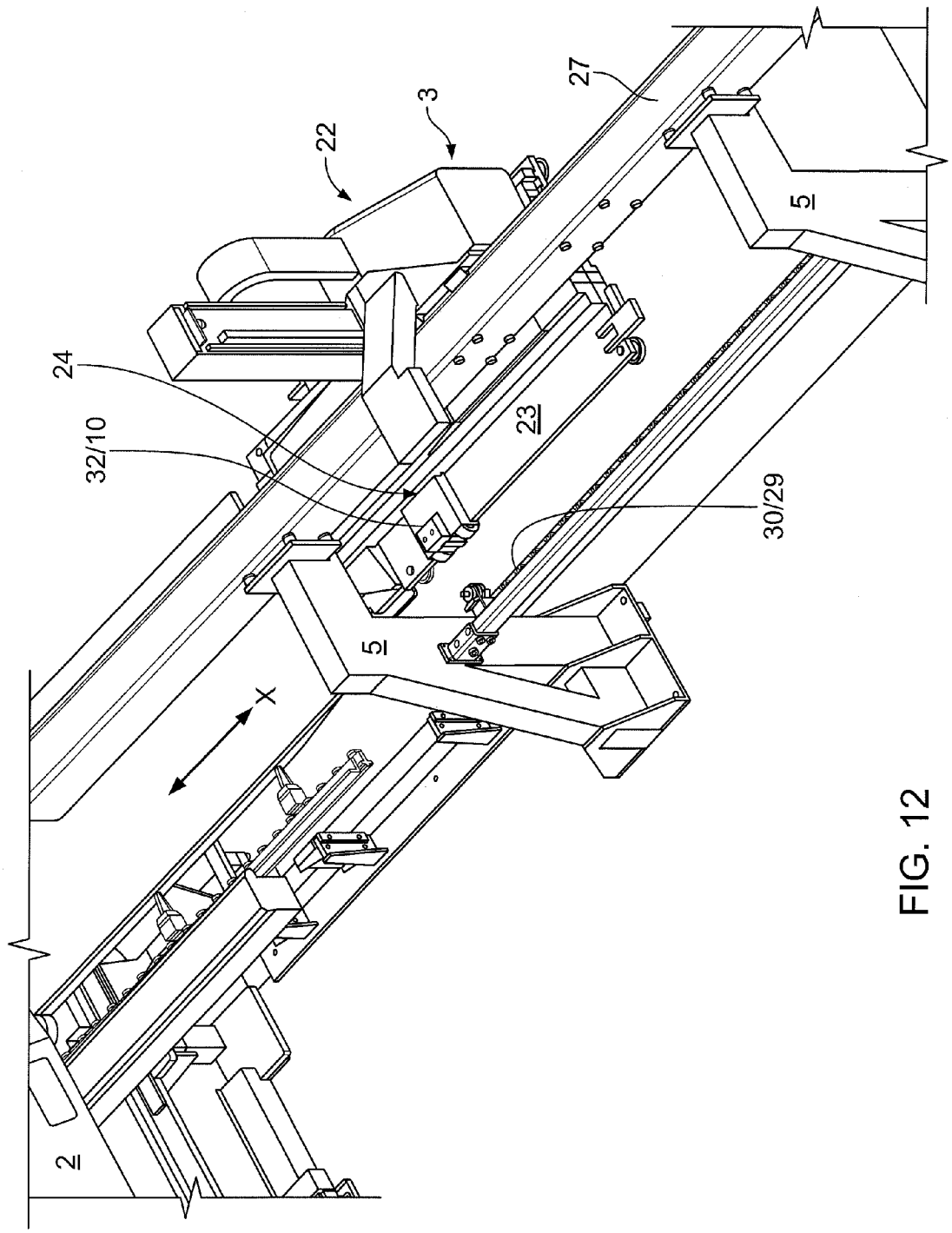
FIGS. 12 to 14 sequentially show a tool being placed in a tool store of the automating device shown in FIG. 1.

The suction frame 23 then travels with the punching tool 10 along the horizontal guide rail 27 of the automating device 3 to the store 29. The travelling movement of the suction frame 23 in the direction of the X axis ends after the punching tool 10 held on the suction frame 23 has reached, with the tool holder 19, the level of a free store-side tool carrier 30 (shown in FIGS. 12 and 13). The end position of the suction frame 23, or of the clamp 33 provided thereon, is stored in the numerical machine control 6. Separate position detection with respect to the free store-side tool carrier 30 in the direction of the X axis is typically not needed since the guides of the suction frame 23 and of the clamp 33 on the support structure 5 of the automating device 3 are connected mechanically to the store-side tool carrier 30 to be served and deformations or changes in the position of the support structure 5 therefore similarly affect the position of the clamp 33 on the suction frame 23 and the position of the store-side tool carriers 30.

Figure 13:
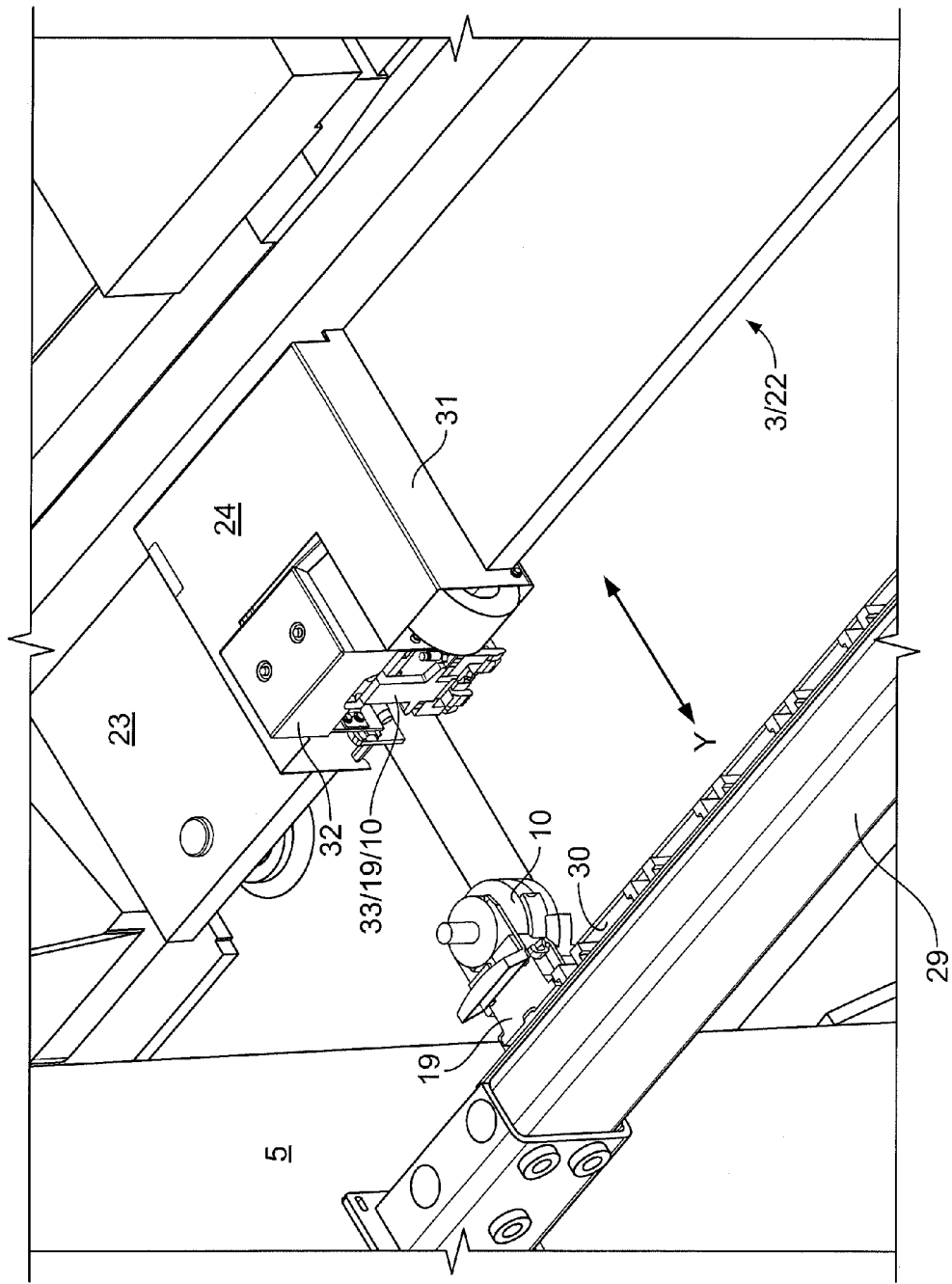
Figure 14:
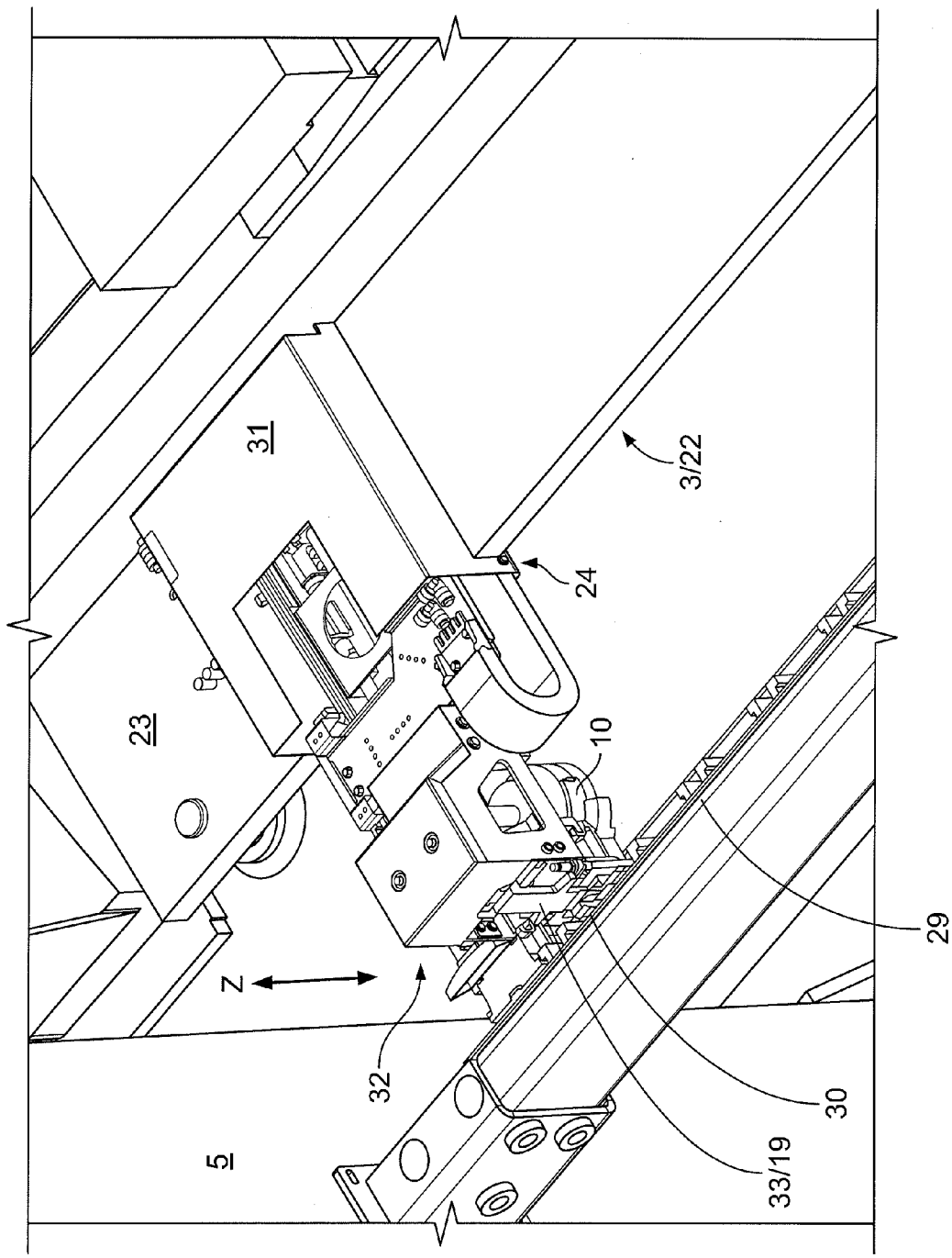

Starting from the operating state shown in FIG. 13, the gripper 32 with the clamp 33 travels out of the housing 31 in the Y direction until the tool holder 19 with the punching tool 10 is arranged above the store-side tool carrier 30 (shown in FIG. 14). Then, by a descending movement of the suction frame 23 in the direction of the Z axis, the tool holder 19 with the punching tool 10 is delivered to the free store-side tool carrier 30 of the store 29. After the delivery, the tool holder 19 is locked on the store-side tool carrier 30.

The pivoting mobility of the clamp 33 relative to the suction frame 23 is also advantageous when the punching tool 10 is delivered to the store-side tool carrier 30. Unexpected changes in the position of the store-side tool carrier 30 to be served can be compensated for and the lower end position of the suction frame 23 in the direction of the Z axis can be defined in terms of control engineering with some degree of tolerance. It can typically be ensured that the tool holder 19, or the punching tool 10, passes in the direction of the Z axis into the nominal position at the store-side tool carrier 30. Due to the pivotable support of the clamp 33 on the suction frame 23, it typically does not matter if the suction frame 23 is lowered further than necessary in the direction of the Z axis.

The pivoting mobility of the clamp 33 has corresponding effects in cases in which punching tools 10 are to be delivered by the suction frame 23 to machine-side tool carriers 15. In the direction of the X axis, that tool delivery is also controlled by the first detection device 34.

A number of embodiments of the invention have been described. Nevertheless, it will be understood that various modifications may be made without departing from the spirit and scope of the invention. Accordingly, other embodiments are within the scope of the following claims.

What is claimed is:
1. A sheet metal processing system comprising:
  a machine tool with a processing station at which metal sheets can be processed by a processing tool;
  a tool carrier for receiving the processing tool;
  a transfer device by which the processing tool can be moved towards or away from the tool carrier;
  a tool change apparatus coupled to the transfer device and that can be, according to a controlled positioning movement performed by a positioning drive of the transfer device, arranged in a tool change position in which the tool change apparatus can exchange the processing tool between the tool carrier and the transfer device; and
  a detection device having a first detection element provided on the tool change apparatus and a second detection element provided on or coupled to the tool carrier,
  wherein a position of the tool change apparatus relative to the tool carrier is detectable by the detection device before a tool change,
  wherein, based on a detected position of the tool change apparatus relative to the tool carrier, the positioning drive of the transfer device is controllable to arrange the tool change apparatus in the tool change position,
  wherein the transfer device is movable with respect to the tool change apparatus while the tool change apparatus remains in the tool change position, and
  wherein the tool change apparatus is coupled to the transfer device by a pivotable connection, the pivotable connection enabling the transfer device to be movable vertically with respect to the tool change apparatus while the tool change apparatus remains in the tool change position.

2. The sheet metal processing system according to claim 1, wherein the tool carrier comprises a machine-side tool carrier that is provided on the machine tool.

3. The sheet metal processing system according to claim 1, further comprising a store for storing the processing tool, wherein tools and the tool carrier comprises a store-side tool carrier provided on the store.

4. The sheet metal processing system according to claim 1, wherein the first detection element of the detection device comprises a stop, wherein the second detection element of the detection device comprises a counter-stop, and wherein the stop is configured to be placed against the counter-stop to arrange the tool change apparatus in the tool change position.

5. The sheet metal processing system according to claim 1, wherein the detection device is a first detection device, the sheet metal processing system further comprising a second detection device provided as a switching arrangement configured to affect movements of the positioning drive of the transfer device to which the tool change apparatus is coupled, the switching arrangement comprising first and second switching elements that serve as detection elements, the first switching element being associated with the tool change apparatus via the pivotable connection between the tool change apparatus and the transfer device, the second switching element being associated with the tool carrier, and the positioning drive of the transfer device being stoppable by the switching arrangement once the tool change apparatus is arranged in a defined manner relative to the tool change position.

6. The sheet metal processing system according to claim 5, wherein the tool change apparatus is arranged in the tool change position upon interaction between the first and second switching elements.

7. The sheet metal processing system according to claim 5, wherein the first detection device is associated with a vertical movement axis along which the tool change apparatus can be moved, and the second detection device is associated with a horizontal movement axis along which the tool change apparatus can be moved,
   wherein before a tool change, the position of the tool change apparatus relative to the tool carrier is detectable by the first detection device in a vertical direction along the vertical movement axis and by the second detection device in a horizontal direction along the horizontal movement axis; and
   wherein the positioning movement is controllable based on the detected position in the vertical and horizontal directions.

8. The sheet metal processing system according to claim 5, wherein the first switching element is provided on the transfer device, and wherein the second switching element is provided on the machine tool adjacent the processing station.

* * * * *

UNITED STATES PATENT AND TRADEMARK OFFICE
CERTIFICATE OF CORRECTION

Page 1 of 1

PATENT NO.       : 9,199,296 B2
APPLICATION NO.  : 13/275489
DATED            : December 1, 2015
INVENTOR(S)      : Busch It is certified that error appears in the above-identified patent and that said Letters Patent is hereby corrected as shown below:

In the claims

Column 9, line 6, Claim 3, delete "tools and".

Signed and Sealed this
First Day of March, 2016

Michelle K. Lee
*Director of the United States Patent and Trademark Office*